L. G. LOOMIS & P. I. TUTTLE.
LAWN SPRINKLER.
APPLICATION FILED AUG. 10, 1908.
919,737.
Patented Apr. 27, 1909.
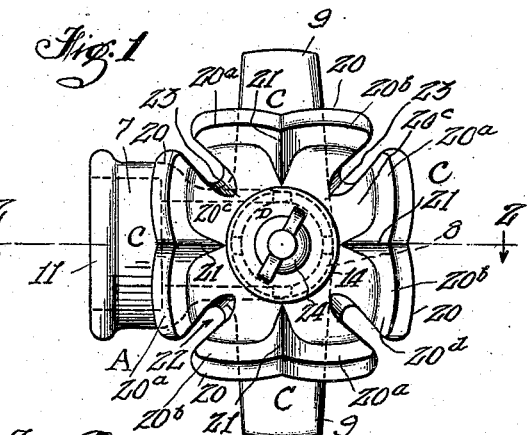
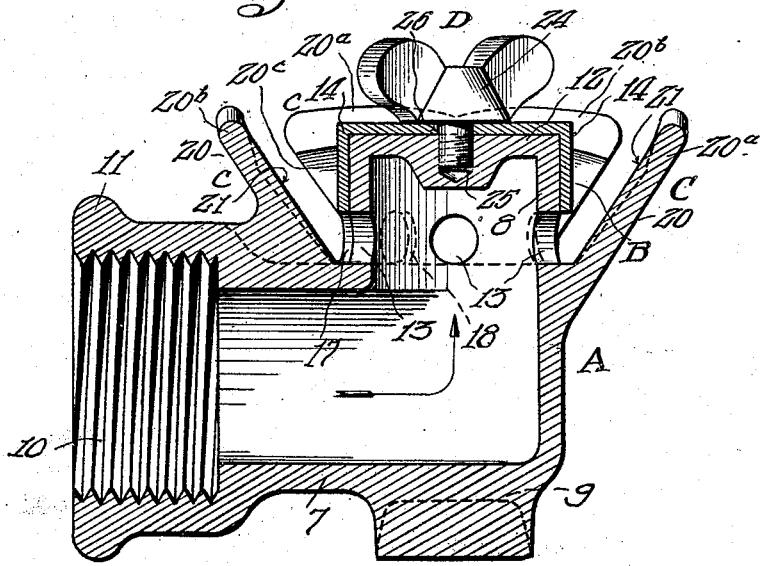
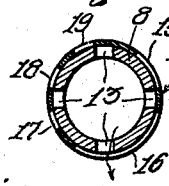
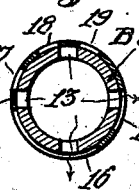
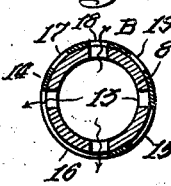
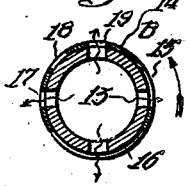
Inventors,
Lester G. Loomis,
Paul Irving Tuttle,

UNITED STATES PATENT OFFICE.

LESTER G. LOOMIS AND PAUL IRVING TUTTLE, OF INGLEWOOD, CALIFORNIA.

LAWN-SPRINKLER.

No. 919,737.     Specification of Letters Patent.     Patented April 27, 1909.

Application filed August 10, 1908. Serial No. 447,881.

*To all whom it may concern:*

Be it known that we, LESTER G. LOOMIS and PAUL IRVING TUTTLE, citizens of the United States, residing at Inglewood, in the county of Los Angeles and State of California, have invented new and useful Improvements in Lawn-Sprinklers, of which the following is a specification.

This invention relates to improvements in lawn sprinklers, and has for its object to provide improvements of the character stated, which will be superior in point of simplicity and inexpensiveness of construction, positiveness and economy of operation, and general efficiency.

The invention consists in the novel provision, construction, formation, combination, association and relative arrangement of parts, members and features, all as hereinafter described, shown in the drawing, and finally pointed out in claims.

In the drawing:—Figure 1 is an upper face view, or plan view, of a lawn sprinkler embodying the invention; Fig. 2 is a vertical transverse sectional view, partly in full lines, taken centrally of Fig. 1, upon the line 2—2, and looking in the direction of the appended arrows; and, Figs. 3, 4, 5 and 6 are detail transverse horizontal sectional views of a portion of the construction, embodying means for varying conditions of ejection of water from the sprinkler.

Corresponding parts in all the figures are denoted by the same reference characters.

Referring with particularity to the drawing, the improved lawn sprinkler comprises a tubular body A, means B for varying the conditions of ejection of water from the tubular body A, and means C for directing the ejected water.

A particular preferred form of provision, construction, form, combination, association and relative arrangement of parts, members and features of an improved lawn sprinkler embodying the invention, is as follows:—

The tubular body A comprises two communicating portions, 7 and 8, respectively, extending rectangularly, each with respect to the other, the portion 7 being intended for emplacement in substantially horizontal position with the portion 8 extending substantially vertically and supported by the portion 7, which may be provided with an elongated foot 9 to insure stability of support, said foot extending transversely of the tubular portion 7. The end of the portion 7 opposite that which communicates with the portion 8 is suitably threaded, as at 10, for connection with a hose or other water supply device; and the same end of the portion 7 may be provided with an annular flange 11 coöperating with the extended foot 9 for stable support of the entire device. The tubular portion 8 projects above the portion 7 and is provided with a closed or headed upper end 12; and directly above the plane of intersection of the portion 8 with the portion 7 are formed a plurality of lateral ports or openings 13 through which the water issues after its traverse of the tubular portion 7. Combined with the ports 13, and included therewith in the means B for varying the conditions of ejection of water from the tubular body A is a circular cap 14, fitting over the headed upper end 12 of the tubular portion 8 and extending downwardly in close fit around the walls of the tubular portion 8, which walls are circular in form and continuous with the exception of the ports or openings 13 therein. Said ports or openings 13 are arranged in a series, the members of which are spaced substantially 90° each from the next adjacent port. The cap 14 is provided with a plurality of ports or openings 15, 16, 17, 18 and 19 adapted for registration, under predetermined conditions of adjustment of the cap 14, with the ports or openings 13. The port 15 is of twice the width of each of the ports 13, which latter are of the same width. The port 16 is of five times the width of each of the ports 13; the port 17 is of the same width as each of the ports 13; the port 18 is of the same width as each of the ports 13 and the port 19 is of the same width as each of the ports 13.

The means C for directing the ejected water, comprises a plurality of fixed wings or blades 20, all substantially of the same formation and dimensions, and grouped in a series around the tubular portion 8, springing upwardly from the plane of connection of said portion 8 with the portion 7. Each of said wings or blades 20 is so arranged that one of the ports or openings 13 opens in registration with the central portion thereof; and each of said wings or blades extends outwardly and upwardly from its base to its outermost end portion with a predetermined inclination with respect to the central axis of the tubular portion 8.

Each of the wings or blades 20 comprises a central edged portion 21 springing from the base thereof and the base of the cap 14 and extending outwardly to the outward perimeter thereof; whereby water issuing from the respective port 13 opposed to said wing or blade, and passing through the respective port 15, 16, 17, 18 or 19, will impinge upon said central edged portion and be divided into two masses, each of which will be deflected by the inner facial portion of a separate half of the said wing or blade; said separate halves or portions being designated as 20$^a$ and 20$^b$. Each of said halves or portions 20$^a$ and 20$^b$ of each of the wings or blades 20, at the respective sides of the central edged portion 21, includes a lower dished or concaved portion 20$^c$, and an outwardly curved edge portion 20$^d$ extending to the perimeter of the wing or blade 20. The material of the wing or blade is slightly thickened in the portions 20$^d$ at the inner face of the wing or blade.

The wings or blades 20 may be formed integrally with the tubular portion 7 of the body A; and said wings or blades are relatively separated by elongated openings 22 extending in proximity to the walls of the cap 14; the wings or blades 20 being connected by webs 23 at the inner extremities of the openings 22. Each of the wings 20 flares outwardly, whereby the openings 22 are each of substantially the same width throughout the extent thereof. It results from the relative arrangement of parts above stated that the openings 22 are disposed in positions, each substantially 45° from each of the next adjacent ports 13.

The cap 14 is freely turnable or rotatable upon the tubular portion 8, and may be fixed in any desired position of adjustment by securing means D comprising a wing-nut 24 having a threaded shank 25, passing through an opening 26 in the end of the cap 14 and screwed into the closed or headed upper end 12 of the tubular portion 8.

The operation, method of use and advantages of the improved lawn sprinkler constituting the invention will be readily understood from the foregoing description taken in connection with the accompanying drawings and the following statement:— Water being admitted to the tubular portion 7 passes upwardly into the tubular portion 8 and thence into the ports or openings 13. With the cap 14 adjusted upon the tubular portion 8, as clearly shown, respectively in Figs. 3, 4, 5 and 6, water is permitted to issue respectively through the port 16, referring to Fig. 3; through the ports 15 and 16, referring to Fig. 4; through the ports 16 and 18, referring to Fig. 5, and through the ports 15, 16, 17 and 19, referring to Fig. 6. With the parts in the position shown in Fig. 3, water will issue through but one of the ports 13; with the parts in the positions shown in Fig. 4, water will issue through two of the ports 13; with the parts in the position shown in Fig. 5, water will issue through three of the ports 13; and with the parts in the positions shown in Fig. 6, water will issue through all four of the ports 13. Water issuing through any one of the ports 13 and a registering port in the cap 14, impinges upon one of the blades or wings 20, being divided into two masses by the central edged portion 21, thereof, and being thence deflected from the dished or concaved portions 20$^c$ and the outwardly curved portions 20$^d$ of the wing or blade, in an upwardly and outwardly directed spray or jet, or plurality of jets. Part of the water, however, circulates over the base of the blade or wing and passes through one or both of the openings 22 between said blade or wing and the next adjacent blades or wings. By adjusting the cap 14 to permit issue of the water from one or more of the ports 13, as desired, the volume of the stream issuing from the device and its direction of issue may be regulated, as desired. The securing means D maintains such predetermined adjustment.

It results from the formation and relative arrangement of the bodies 20 comprising the means C for directing the ejected water, including the provision of the elongated openings 22, whereby said bodies 20 are spaced apart, that the water deflected by the bodies 20 covers a predetermined area surrounding the sprinkler device, of square formation. The elongated openings 22 permit the radiation of water between the bodies 20 in such manner that the portions of the area not sprayed by the bodies 20 are completely sprayed; with the result that all the territory surrounding the sprinkler device, within the outer confines of the moistened area, is completely and effectively sprayed and sprinkled.

We do not desire to be understood as to limiting ourselves to the specific construction, provision, combination, relative arrangement and association of parts, members and features shown and described; but reserve the right to vary the same, in adapting the improvements to varying conditions of use, without departing from the spirit of the invention and the terms of the following claims:—

Having thus described our invention, we claim and desire to secure by Letters Patent:—

1. A device of the character described, comprising an annular tubular body provided with a plurality of spaced ports, means for permitting egress of liquid through one or more of said spaced ports, and a plurality of wings or blades grouped in a series around said tubular body and arranged respectively in registration with said spaced ports.

2. A device of the character described, comprising an annular tubular body provided with a plurality of spaced ports, means for permitting egress of liquid through one or more of said spaced ports, and a plurality of wings or blades grouped in a series around said tubular body and arranged respectively in registration with said spaced ports; each of said wings or blades being provided with an intermediate edge portion upon which the fluid issuing from the respective port directly impinges.

3. A device of the character described, comprising a tubular body consisting of connected angularly related tubular portions, one of which is provided with a plurality of spaced lateral ports; means controlling the egress of liquid through one or more of said ports; and a plurality of wings or blades grouped in a series around the tubular portion provided with said ports substantially at the plane of connection of said tubular portions; said wings or blades being separated by openings; and each of said wings or blades flaring outwardly from its base and being provided with an intermediate edged portion and with lateral dished or concave portions; said edged portions being respectively in registration with said ports.

4. In a device of the character described, means for directing the ejected fluid, comprising an outwardly inclined and tapering wing or blade having an intermediate longitudinal edged portion and lateral dished or concave portions terminating in outward curved edged portions.

5. A device of the character described, comprising an annular tubular body provided with a plurality of spaced ports, an adjustable cap fitting over said tubular body and provided with a plurality of spaced ports arranged for predetermined registration with said first named ports, and a plurality of bodies arranged respectively in registration with said first named ports for directing the fluid ejected from the same.

6. An improved device of the character described, comprising a tubular body, and means for directing the fluid ejected from the tubular body to cover completely a square area surrounding the device; said means comprising a plurality of spaced bodies separated by elongated openings.

In testimony whereof, we have signed our names to this specification in the presence of two subscribing witnesses.

LESTER G. LOOMIS.
PAUL IRVING TUTTLE.

Witnesses:
RAYMOND I. BLAKESLEE,
CAL. F. HUNTER.